US008609988B2

(12) United States Patent
Sagawa et al.

(10) Patent No.: US 8,609,988 B2

(45) Date of Patent: Dec. 17, 2013

(54) ELECTRIC WIRE WITH TERMINAL AND METHOD OF MANUFACTURING THE SAME

(75) Inventors: Hideyuki Sagawa, Naka-gun (JP); Tosiyuki Horikoshi, Mito (JP); Hiromitsu Kuroda, Hitachi (JP); Hideaki Takehara, Hitachi (JP); Toru Sumi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 238 days.

(21) Appl. No.: 12/929,700

(22) Filed: Feb. 9, 2011

(65) Prior Publication Data

US 2011/0198122 A1 Aug. 18, 2011

(30) Foreign Application Priority Data

Feb. 16, 2010 (JP) ................................ 2010-031471

(51) Int. Cl.

| | |
|---|---|
| ***H01R 4/00*** | (2006.01) |
| ***H02G 3/06*** | (2006.01) |
| ***H02G 15/08*** | (2006.01) |

(52) U.S. Cl.

USPC ........ 174/84 R; 174/88 C; 174/90; 174/94 R; 174/84 C; 439/875

(58) Field of Classification Search

None

See application file for complete search history.

(56) References Cited

U.S. PATENT DOCUMENTS

| | | | | |
|---|---|---|---|---|
| 3,717,842 | A * | 2/1973 | Douglas, Jr. | 29/860 |
| 6,657,127 | B2 * | 12/2003 | Saito | 174/84 C |
| 2006/0057903 | A1 * | 3/2006 | Asakura et al. | 439/874 |
| 2008/0230269 | A1 * | 9/2008 | Susai et al. | 174/84 C |

FOREIGN PATENT DOCUMENTS

| | | |
|---|---|---|
| JP | 07-326412 | 12/1995 |
| JP | 2003-117666 | 4/2003 |

* cited by examiner

*Primary Examiner* — Jayprakash N Gandhi

*Assistant Examiner* — Dion Ferguson

(74) *Attorney, Agent, or Firm* — McGinn IP Law Group, PLLC

(57) ABSTRACT

An electric wire with a terminal includes a conductor, and the terminal is connected to an end portion of the conductor. The terminal includes a first connecting portion connected to an electrical equipment and a second connecting portion connected to the conductor. The second connecting portion includes a first connection surface and a second connection surface opposite to the first connection surface. The conductor includes a first conductor and a second conductor that are connected to the first connection surface and the second connection surface, respectively, by ultrasonic bonding. The connecting portion of the first connection surface overlaps the connecting portion of the second connection surface in a perpendicular direction to an axial direction of the conductor.

19 Claims, 6 Drawing Sheets

ELECTRIC WIRE WITH TERMINAL AND METHOD OF MANUFACTURING THE SAME

The present application is based on Japanese Patent Application No. 2010-031471 filed on Feb. 16, 2010, the entire contents of which are incorporated herein by reference.

BACKGROUND OF THE INVENTION

1. Field of the Invention

The invention relates to an electric wire with terminal and a method of manufacturing the same, in particular, to an electric wire with terminal which is wired inside a device of a vehicle, etc., and has a conductor having a large cross-sectional area, and to a method of manufacturing the same.

2. Description of the Related Art

A wire with terminal in which a terminal for equipment connection is preliminarily bonded to and integrated with a wire conductor is often used for wiring inside a device of a vehicle, etc.

As a method of connecting a terminal to a wire conductor, a method in which a wire conductor having a certain volume (cross-sectional area) is compression-bonded to a surface of a plate-like terminal formed of Cu or a Cu alloy by using a compression device or a compression tool, so-called "compression joint method", is generally employed in a method of manufacturing a wire with terminal.

On the other hand, when it is not possible to apply much compressing force due to a material, etc., of a conductor, an ultrasonic bonding method in which a terminal and a conductor are bonded by applying ultrasonic energy and pressure to a connection interface therebetween is sometimes employed. The ultrasonic bonding method is sometimes called an ultrasonic welding process.

The ultrasonic bonding method is advantageous in that it is easy to obtain reliability of electrical connection since an active surface can be exposed by destroying an oxide film each formed on the surfaces of the terminal and the conductor using ultrasonic.

JP-A 2003-117666, which is a prior art, describes an ultrasonic compression bonding apparatus which allows continuous conduction of ultrasonic bonding and compression joint in one apparatus. According to JP-A 2003-117666, the ultrasonic compression bonding apparatus compensates for deficiency of the mechanical connection strength in the ultrasonic bonding by combining the compression joint and it is thereby possible to ensure mechanical connection strength between a terminal and a conductor and to obtain reliability of electrical connection without applying excessive ultrasonic energy or pressure during the ultrasonic bonding. In addition, according to JP-A 2003-117666, the ultrasonic compression bonding apparatus allows efficient connection work by continuously conducting the ultrasonic bonding and the compression joint.

Meanwhile, JP-A 7-326412 describes a plate like terminal which has a connecting portion connected to an electrical equipment and a pressure bonding portion connected to a wire, and in which at least two or more pressure bonding portions connected to a wire are alternately provided in a vertical direction with respect to a flat surface of the connecting portion, i.e., in an opposing direction, and notched terminal pieces composing the pressure bonding portions and used for pressure bonding are each shaped into a cylindrical closed barrel shape by using the compression joint method.

SUMMARY OF THE INVENTION

In recent years, an electric wire with terminal in which an Al conductor having a cross-sectional area of 20 $mm^2$ or more is bonded to and integrated with an Al terminal by compression joint is demanded as a battery cable for a HEV vehicle.

However, JP-A 2003-117666 and JP-A 7-326412 in which the compression joint is used have a problem that it becomes difficult to exposed an active surface by destroying an oxide film formed on a surface of a conductor using plastic deformation at the time of compression as the cross-sectional area of the conductor increases (e.g., a cross-sectional area of 20 $mm^2$ or more) especially when the conductor is formed by twisting plural strands together, which result in a decrease in reliability of mechanical connection strength (connection strength) and electrical connection (contact resistance).

As one of such compression joint methods, there is a method in which the compression joint is conducted after a special treatment such as soldering is performed on an edge of a conductor in order to improve reliability of mechanical connection strength and electrical connection, however, there is a problem that the number of processes and the cost greatly increase.

Meanwhile, in the ultrasonic compression bonding method (between a terminal and a conductor) using an ultrasonic compression bonding apparatus described in JP-A 2003-117666, there is a problem that, when, e.g., an Al or Al alloy conductor (e.g., a conductor having a cross-sectional area of 20 $mm^2$ or more) is bonded to a terminal formed of Cu or a Cu alloy, mechanical connection strength between the terminal and the conductor decreases under a thermal cycle environment due to a decrease in mechanical grip force caused by a thermal expansion coefficient difference between Cu and Al, accordingly, the reliability of the electrical connection between the terminal and the conductor also decreases. In addition, when an open barrel-shaped crimp-type terminal described in FIGS. 6 to 8 of JP-A 2003-117666 is used and an Al or Al ally conductor having a large cross-sectional area is bonded to an Al or Al alloy terminal, it is not possible to impart sufficient crimp force to an Al member having small deformation resistance, and thus, a problem in reliability of mechanical connection strength and electrical connection occurs.

Therefore, it is an object of the invention to provide an electric wire with terminal in which a conductor having a large cross-sectional area is bonded to a terminal while ensuring reliability of mechanical connection strength and electrical connection higher than a conventional art, and to provide a method of manufacturing the same.

(1) According to one embodiment of the invention, an electric wire with a terminal comprises:

a conductor; and the terminal connected to an end portion of the conductor, wherein the terminal comprises a first connecting portion connected to an electrical equipment and a second connecting portion connected to the conductor, the second connecting portion comprises a first connection surface and a second connection surface opposite to the first connection surface, the conductor comprises a first conductor and a second conductor that are connected to the first connection surface and the second connection surface, respectively, by ultrasonic bonding, and a total cross-sectional area of the first conductor and the second conductor is not less than 20 $mm^2$.

According to the electric wire with terminal, a distance to a connection interface (between a terminal and a wire conductor) for transferring ultrasonic energy can be shortened by bonding the wire conductor to both surfaces of the terminal using ultrasonic bonding by employing the above-mentioned configuration as compared to the case where a wire conductor having the same total cross-sectional area is bonded to only one surface, and it is thereby possible to enhance transfer characteristics of the ultrasonic energy. Thus, the connection can be carried out by a single connection process which is the ultrasonic bonding, hence, a wide range of wire conductors which are made of Cu or a Cu alloy as well as Al or an Al alloy and have a small cross-sectional area as well as a large cross-sectional area (a cross-sectional area of 20 $mm^2$ or more) can be bonded at low cost, and reliability of mechanical connection strength and electrical connection (contact resistance) can be enhanced. Additionally, in this electric wire with terminal, a contact area between the terminal and the wire conductor can be increased by bonding the wire conductor to the both surfaces of the terminal as compared to the case of bonding to one surface, and this also allows the reliability of mechanical connection strength and electrical connection (contact resistance) to be enhanced.

In the above embodiment (1) of the invention, the following modifications and changes can be made.

(i) A cross-sectional area of the first conductor is not more than that of the second conductor.

In addition to the above-mentioned effect, according to the above modification (i), the reliability of mechanical connection strength and electrical connection (contact resistance) can be enhanced by employing the above-mentioned configuration as compared to a conventional art when a wire conductor having the total cross-sectional area of 20 $mm^2$ or more is connected to a terminal since an ultrasonic energy transfer distance from the ultrasonic bonding apparatus provided on a first conductor side to a first connection surface as well as a second connection surface is short.

(ii) The first conductor and the second conductor each belong to different electric wires.

In addition to the above mentioned effect, according to the above modification (ii), two different wires can be bonded to a single terminal by employing the above-mentioned configuration. And it is thereby possible to bond a wire conductor having the large total cross-sectional area.

(iii) The first conductor and the second conductor belong to a same electric wire.

In addition to the above mentioned effect, according to the above modification (iii), since a wire conductor having a large cross-sectional area is divided into two by employing the above-mentioned configuration, the wire conductor can be effectively bonded to both surfaces of a terminal by ultrasonic bonding without increasing the number of wires.

(iv) A (A)/(B) ratio is not more than 167, where (A) is the total cross-sectional area of the first conductor and the second conductor and (B) is an outer diameter of a strand (or a single wire) composing the (stranded) conductor.

In addition to the above mentioned effect, according to the above modification (iv), since strand breakage is less likely to occur at the time of connection by employing the above-mentioned configuration, i.e., by having an (A)/(B) ratio of 167 or less, where (A) is the total cross-sectional area of the first and second conductors and (B) is an outer diameter of a strand composing the conductor, it is possible to suppress a decrease in the mechanical connection strength and the electrical connection (contact resistance) due to the strand breakage. Regarding the outer diameter of strand (B), when an outer diameter of the first conductor is different from that of the second conductor, the outer diameter of the smaller strand is defined as the outer diameter of strand (B).

(2) According to another embodiment of the invention, a method of manufacturing an electric wire with a terminal comprises:

providing an electric wire comprising a conductor;

providing the terminal comprising a first connecting portion connected to an electrical equipment and a second connecting portion connected to the conductor, wherein the second connecting portion comprises a first connection surface and a second connection surface opposite to the first connection surface, the conductor comprising a first conductor and a second conductor that are connected to the first connection surface and the second connection surface, respectively; and connecting the first conductor and the second conductor to the first connection surface and the second connection surface, respectively, of the second connecting portion by ultrasonic bonding, wherein a total cross-sectional area of the first conductor and the second conductor is not less than 20 $mm^2$.

According to the above method, a distance to a connection interface (between a terminal and a wire conductor) for transferring ultrasonic energy can be shortened by bonding the wire conductor to both surfaces of the terminal using ultrasonic bonding by employing the above-mentioned configuration as compared to the case where a wire conductor having the same total cross-sectional area is bonded to only one surface, and it is thereby possible to enhance transfer characteristics of the ultrasonic energy. Thus, the connection can be carried out by a single connection process which is the ultrasonic bonding, hence, a wide range of wire conductors which are made of Cu or a Cu alloy as well as Al or an Al alloy and have a small cross-sectional area as well as a large cross-sectional area (a cross-sectional area of 20 $mm^2$ or more) can be bonded at low cost, and reliability of mechanical connection strength and electrical connection (contact resistance) can be enhanced. Additionally, in this method of manufacturing an electric wire with terminal, a contact area between the terminal and the conductor can be increased by bonding the wire conductor to the both surfaces of the terminal as compared to the case of bonding to one surface, and this also allows the reliability of mechanical connection strength and electrical connection (contact resistance) to be enhanced.

In the above embodiment (2) of the invention, the following modifications and changes can be made.

(v) The first conductor and the second conductor are formed by dividing an end portion of a same wire conductor into two.

In addition to the above mentioned effect, according to the above modification (v), since a wire conductor having a large cross-sectional area is divided into two by employing the above-mentioned configuration, the wire conductor having a large cross-sectional area can be effectively bonded to both surfaces of a terminal by ultrasonic bonding without increasing the number of wires.

POINTS OF THE INVENTION

According to one embodiment of the invention, an electric wire with terminal is produced such that Al conductors having, e.g., a cross-sectional area of 10 $mm^2$ are respectively bonded to the both surfaces of a plate-like terminal by ultrasonic bonding, so that the Al conductors with a total cross-sectional area of 20 $mm^2$ can be bonded at an ultrasonic energy and pressure equivalent to those for bonding an Al conductor with a cross-sectional area of 10 $mm^2$ to one surface of the plate-like terminal. As a result, it is possible to enhance the reliability of mechanical connection strength and electrical connection (contact resistance) between the conductor and the terminal in an electric wire formed of Cu or a Cu alloy as well as of Al or an Al alloy and having a large cross-sectional area (i.e., 20 $mm^2$ or more in total).

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Preferred embodiments of the invention will be described below in conjunction with FIGS. 1 to 11, however, it is obvious that the invention is not limited to the embodiments.

Figure 1:
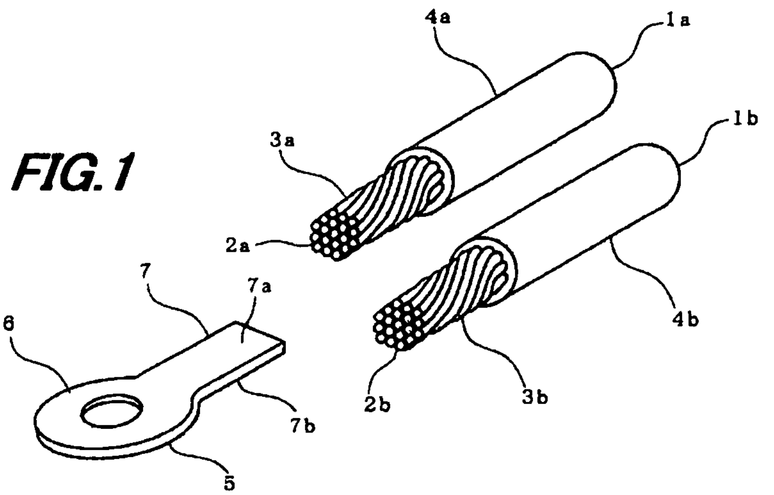
FIG. 1 is a perspective view showing an electric wire with terminal in an embodiment of the present invention in a state before connection.
Figure 2:
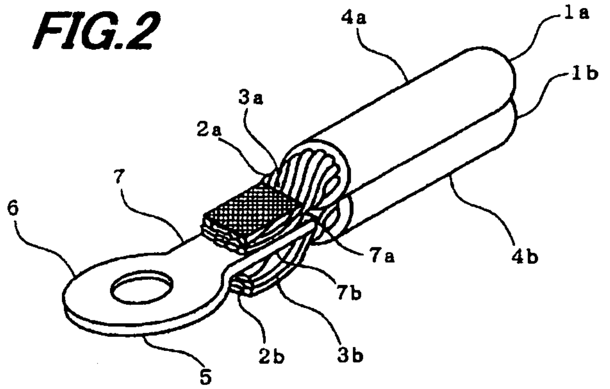
FIG. 2 is a perspective view showing the electric wire with terminal in the embodiment of the invention in a state after connection.

As described above, FIG. 1 is a perspective view showing an electric wire with terminal in an embodiment of the invention in a state before connection and FIG. 2 is a perspective view showing the electric wire with terminal in the embodiment of the invention in a state after connection.

In FIGS. 1 and 2, electric wires 1*a* and 1*b* are respectively composed of conductors 3*a* and 3*b* formed of a twisted wire formed by twisting plural Al (or Cu) strands 2*a* and 2*b* and an insulation layer 4 formed by extrusion to cover peripheries of the conductors 3*a* and 3*b*, and a plate-like terminal 5 has a first connecting portion 6 connected to a non-illustrated electrical equipment and a second connecting portion 7 connected to the conductors 3*a* and 3*b* of the electric wires 1*a* and 1*b*. A first connection surface 7*a* is provided on the second connecting portion 7 of the plate-like terminal 5 and is bonded to the conductor 3*a*, and a second connection surface 7*b* is provided on the second connecting portion 7 of the plate-like terminal 5 and is bonded to the conductor 3*b*. The conductor 3*a* corresponds to the first conductor of the invention, and the conductor 3*b* corresponds to the second conductor of the invention.

Outer diameters of the strands 2*a* and 2*b* which compose the conductors 3*a* and 3*b* may be either the same or different. Meanwhile, a cross-sectional area of the conductor 3*a* may be either the same as or different from that of the conductor 3*b*, and the effect of the invention can be obtained as long as the total cross-sectional area of the conductors 3*a* and 3*b* is 20 $mm^2$ or more.

In the present embodiment, although pure Al is used for the Al strands 2*a* and 2*b* which respectively compose the conductors 3*a* and 3*b* of the electric wires 1*a* and 1*b*, it is possible to use Al alloys having a variety of alloy properties depending on the intended use of the electric wires 1*a* and 1*b*. When Al or an Al alloy with small specific gravity is used as the conductors 3*a* and 3*b* of the electric wires 1*a* and 1*b*, the weight of the electric wires 1*a* and 1*b* can be reduced as compared to the case of using Cu or a Cu alloy, hence, use of Al or an Al alloy for a conductor is studied mainly in a field of automobile wire. However, it is obvious that Cu or a Cu alloy can be used.

A specific example of an Al alloy used for a conductor includes various Al alloys containing Al and one or more elements selected from Si, Fe, Ni, Mn, Mg, Zn and Ti.

In addition, for example, polypropylene resin, polyethylene resin and fluorine resin, etc., are used as a composition of the insulation layer 4 in the present embodiment.

Meanwhile, Cu, a Cu alloy, Al or an Al alloy is generally used as a material forming the plate-like terminal 5, however, it is not limited thereto. A specific example of a Cu alloy forming the plate-like terminal 5 includes various Cu alloys containing Cu and one or more elements selected from Si, Fe, Mn, Mg, Mo, Zn, Ti and P. In addition, a specific example of an Al alloy also forming the plate-like terminal 5 includes various Al alloys containing Al and one or more elements selected from Si, Fe, Ni, Mn, Mg, Zn and Ti.

In the present embodiment, the conductors 3*a* and 3*b* of the electric wires 1*a* and 1*b* each formed of pure Al are positioned in contact with both surfaces of the second connecting portion 7 (the first connection surface 7*a* and the second connection surface 7*b*) of the plate-like terminal 5 formed of Cu or a Cu alloy and the conductors 3*a* and 3*b* are bonded to the second connecting portion 7 by ultrasonic bonding without performing pretreatment such as soldering, Sn plating or mechanical polishing on the connection surfaces of both. As an ultrasonic bonding method, ultrasonic horns of a non-illustrated ultrasonic bonding apparatus (e.g., an ultrasonic bonding apparatus including a pedestal having a groove formed on an upper surface thereof for inserting a conductor and a plate-like terminal, and an ultrasonic horn formed to be engaged with the groove of the pedestal and provided with a horn chip at the distal end thereof which comes in contact with the conductor at the time of connection) are brought in contact with each of the conductors 3*a* and 3*b* of the electric wires 1*a* and 1*b*, and the conductors 3*a* and 3*b* of the electric wires 1*a* and 1*b* and the both surfaces of the plate-like terminal 5 (the first connection surface 7*a* and the second connection surface 7*b*) are bonded by ultrasonic bonding in which ultrasonic energy and pressure (the conditions are, e.g., frequency of 40 Hz, applied pressure of 0.1-0.4 MPa and ultrasonic energy of 1-3000 J) are applied to each connection interface between Cu and Al. FIG. 2 shows a state after the ultrasonic bonding.

According to the electric wire with terminal and the method of manufacturing the same in the present embodiment, since the Al conductors 3*a* and 3*b* having, e.g., a cross-sectional area of 10 $mm^2$ are respectively bonded to the both surfaces of the plate-like terminal 5 (the first connection surface 7*a* and the second connection surface 7*b*) by ultrasonic bonding, the Al conductors 3*a* and 3*b* of which total cross-sectional area is 20 $mm^2$ can be bonded at an ultrasonic energy and pressure equivalent to the case where an Al conductor having a cross-sectional area of 10 $mm^2$ is bonded to one surface of the plate-like terminal 5. This is because an ultrasonic energy transfer distance from the ultrasonic bonding apparatus (the ultrasonic horn) to the first connection surface 7*a* or the second connection surface 7*b* (which is a connection interface between the conductor and the terminal to be connected) is shorter than the case where an Al conductor having a cross-sectional area of 20 $mm^2$ is bonded to one surface of the plate-like terminal 5 by ultrasonic bonding, and the transfer characteristics of the ultrasonic energy are thereby improved. As a result, it is possible to enhance the reliability of mechanical connection strength and electrical connection (contact resistance) between a conductor and a terminal in electric wires formed of Cu or a Cu alloy as well as of Al or an Al alloy and having a large cross-sectional area (the total cross-sectional area of 20 $mm^2$ or more). Particularly, the larger the cross-sectional area of the wire conductor to be connected, the larger the effect, and when the wire conductor is a twisted wire formed by twisting plural strands, it is highly effective to prevent strand breakage of the twisted wire. In addition, since the connection can be carried out by a single connection process which is the ultrasonic bonding, it is possible to realize connection at low cost. Furthermore, according to the electric wire with terminal and the method of manufacturing the same described above, a contact area between the plate-like terminal 5 and the conductors 3*a* and 3*b* of the electric wires 1*a* and 1*b* can be increased about twofold by bonding the wire conductor to the both surfaces of the terminal as compared to the case of bonding to one surface, and this also allows the reliability of mechanical connection strength and electrical connection (contact resistance) to be enhanced.

Figure 3:
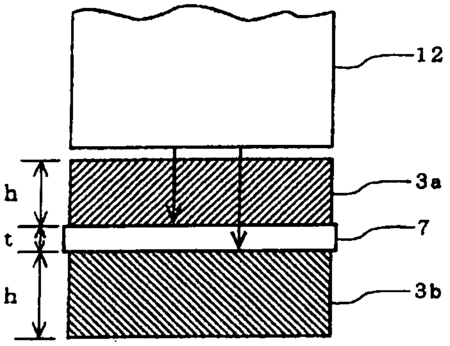
FIG. 3 is a schematic partial cross sectional view showing a connecting portion for explaining an effect of the invention when a cross-sectional area of a first conductor is smaller than that of a second conductor.

Meanwhile, when the cross-sectional area of the conductor 3*a* corresponding to the first conductor of the invention is not more than (i.e., the same as or less than) that of the conductor 3*b* corresponding to the second conductor of the invention in the present embodiment, a distance for transferring ultrasonic energy (indicated by allows) from an ultrasonic bonding apparatus (ultrasonic horn) 12 provided on the conductor 3*a* side to the first connection surface 7*a* as well as to the second connection surface 7*b* is reduced as shown in FIG. 3. Therefore, it is possible to enhance the reliability of mechanical connection strength and electrical connection (contact resistance) as compared to a conventional art even when a wire conductor of which total cross-sectional area is 20 $mm^2$ or more is bonded to a plate-like terminal by ultrasonic bonding. Here, FIG. 3 is a schematic partial cross sectional view showing a connecting portion for explaining an effect of the invention when a cross-sectional area of the first conductor is smaller than that of the second conductor, and in FIG. 3, h is a height of the conductor 3*a* in a cross section of the connected portion, t is a thickness of the plate-like terminal 5 and h' is a height of the conductor 3*b* in a cross section of the connected portion.

Figure 4:
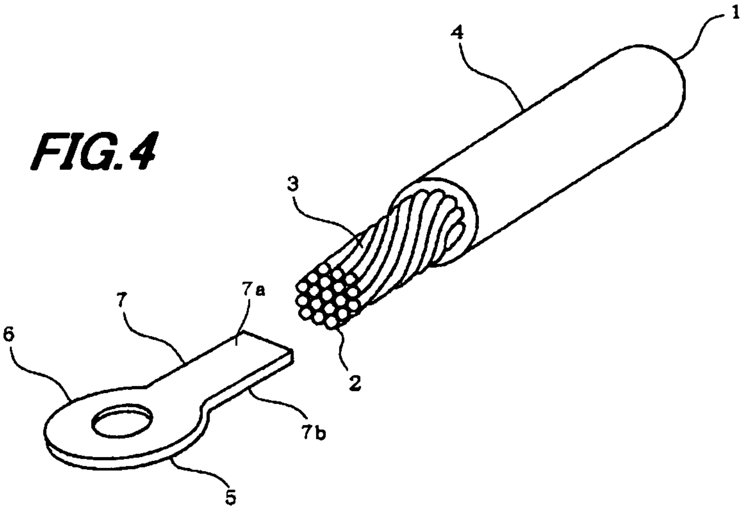
FIG. 4 is a perspective view showing an electric wire with terminal in another embodiment of the invention in a state before connection.
Figure 5:
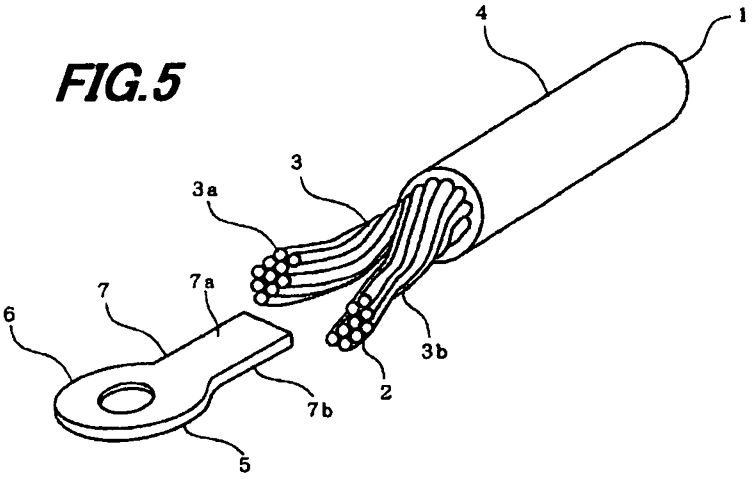
FIG. 5 is a perspective view showing the electric wire with terminal in the other embodiment of the invention in a state that the end portion of the conductor is divided into two before the connection.
Figure 6:
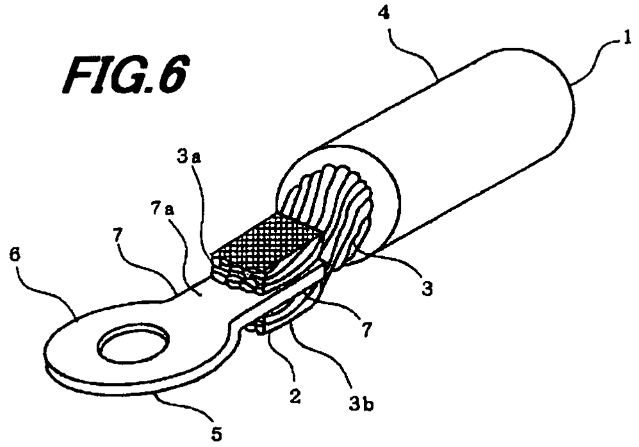
FIG. 6 is a perspective view showing the electric wire with terminal in the other embodiment of the invention in a state after connection.

FIG. 4 is a perspective view showing an electric wire with terminal in another embodiment of the invention in a state before connection, FIG. 5 is a perspective view showing the electric wire with terminal in the other embodiment of the invention in a state that the end portion of the conductor is divided into two before the connection, and FIG. 6 is a perspective view showing the electric wire with terminal in the other embodiment of the invention in a state after connection.

In FIGS. 4, 5 and 6, the structure of the plate-like terminal 5 and the basic structure of a wire 1 are the same as the first embodiment. Regarding a conductor 3 (3*a* and 3*b*) of the wire 1 of the present embodiment, an end portion of the conductor 3 of a single wire is divided into two (without using two wires) and is bonded to each of the both surfaces of the plate-like terminal 5 by ultrasonic bonding, therefore, it is possible to employ a single wire of which conductor has a large cross-sectional area. As a result, a wire conductor having a large cross-sectional area can be effectively bonded by using ultrasonic bonding without increasing the number of wires.

In the present embodiment, as shown in FIG. 6, an end portion of the conductor 3 (3*a* and 3*b*) of the wire 1 is divided into two, the two conductors 3*a* and 3*b* of the wire 1 divided as described above are positioned in contact with the both surfaces of the second connecting portion 7 (the first connection surface 7*a* and the second connection surface 7*b*) of the plate-like terminal 5, then bonded by ultrasonic bonding in the same manner as the first embodiment.

It is obvious that the same effect as the first embodiment can be also obtained in the present embodiment.

In the electric wire with terminal as shown in FIGS. 2 and 6, it is preferred that an area ($S_1$) of a contact portion between the first connection surface (7*a*) and the first conductor (3*a*) is the same or more than the cross-sectional area of the first conductor (3*a*). Also, it is preferred that an area ($S_2$) of a contact portion between the second connection surface (7*b*) and the second conductor (3*b*) is the same or more than the cross-sectional area of the second conductor (3*b*). By connecting the conductors to the terminal under the above conditions, increase in the connection strength and reduction in the connection resistance can be surely attained at the interface between the terminal and the conductors connected by the ultrasonic welding (or bonding). Also, after the connection is completed, decrease in the connection strength and increase in the connection resistance can be effectively prevented.

EXAMPLES

Example 1

Using electric wires (1*a*, 1*b*) which have Al conductors (3*a*, 3*b*) each having a conductor cross-sectional area of 10 $mm^2$ formed by twisting plural Al strands (2*a*, 2*b*) with a diameter of 1.0 mm, two of the Al conductors (3*a*, 3*b*) in total were positioned in contact with both surfaces of a 1.5 mm thick Cu plate simulating the plate-like terminal 5 shown in FIGS. 1 and 2, and the Cu plate and the Al conductors (3*a*, 3*b*) were bonded and integrated at the same time by ultrasonic bonding. In this case, the total conductor cross-sectional area (A) of the two Al conductors (3*a*, 3*b*) is 20 $mm^2$, the diameter of the strand (B) is 1.0 mm and an A/B ratio is 20.

Example 2

Using electric wires (1*a*, 1*b*) which have Al conductors (3*a*, 3*b*) each having a conductor cross-sectional area of 20 $mm^2$ formed by twisting plural Al strands (2*a*, 2*b*) with a diameter of 1.0 mm, two of the Al conductors (3*a*, 3*b*) in total were positioned in contact with both surfaces of a 1.5 mm thick Cu plate simulating the plate-like terminal 5 shown in FIGS. 1 and 2, and the Cu plate and the Al conductors (3*a*, 3*b*) were bonded and integrated at the same time by ultrasonic bonding. In this case, the total conductor cross-sectional area (A) of the two Al conductors (3*a*, 3*b*) is 40 $mm^2$, the diameter of the strand (B) is 1.0 mm and an A/B ratio is 40.

Example 3

Using electric wires (1*a*, 1*b*) which have Al conductors (3*a*, 3*b*) each having a conductor cross-sectional area of 25 $mm^2$ formed by twisting plural Al strands (2*a*, 2*b*) with a diameter of 1.0 mm, two of the Al conductors (3*a*, 3*b*) in total were positioned in contact with both surfaces of a 1.5 mm thick Cu plate simulating the plate-like terminal 5 shown in FIGS. 1 and 2, and the Cu plate and the Al conductors (3*a*, 3*b*) were bonded and integrated at the same time by ultrasonic bonding.

In this case, the total conductor cross-sectional area (A) of the two Al conductors (3*a*, 3*b*) is 50 mm$^2$, the diameter of the strand (B) is 1.0 mm and an A/B ratio is 50.

Example 4

Using an electric wire 1*a* which has an Al conductor 3*a* having a conductor cross-sectional area of 25 mm$^2$ formed by twisting plural Al strands 2*a* with a diameter of 1.0 mm, the Al conductor 3*a* was positioned in contact with one surface of a 1.5 mm thick Cu plate simulating the plate-like terminal 5 shown in FIGS. 1 and 2, and the Cu plate and the Al conductor 3*a* were bonded and integrated by ultrasonic bonding. Subsequently, using an electric wire 1*b* which has an Al conductor 3*b* having the same structure, the Al conductor 3*b* was positioned in contact with another surface of the Cu plate, and the Cu plate and the Al conductor 3*b* were bonded and integrated by ultrasonic bonding in the same manner. That is, the Al conductors (3*a*, 3*b*) having the same conductor cross-sectional area were each bonded to and integrated with the both surfaces of the Cu plate by ultrasonic bonding in two stages. In this case, the total conductor cross-sectional area (A) of the two Al conductors (3*a*, 3*b*) is 50 mm$^2$, the diameter of the strand (B) is 1.0 mm and an A/B ratio is 50.

Example 5

As shown in FIGS. 4, 5 and 6, an end portion of an Al conductor 3 having a conductor cross-sectional area of 50 mm$^2$ formed by twisting plural Al strands 2 with a diameter of 1.0 mm is divided into two, the two Al conductors 3*a* and 3*b* divided as described above were positioned in contact with both surfaces of a 1.5 mm thick Cu plate simulating the plate-like terminal 5, and the Cu plate and the Al conductors (3*a*, 3*b*) were bonded and integrated at the same time by ultrasonic bonding. In this case, the total conductor cross-sectional area (A) of a single Al conductor 3 is 50 mm$^2$, the diameter of the strand (B) is 1.0 mm and an A/B ratio is 50.

Example 6

Using electric wires (1*a*, 1*b*) which have Al conductors (3*a*, 3*b*) each having a conductor cross-sectional area of 25 mm$^2$ formed by twisting plural Al strands (2*a*, 2*b*) with a diameter of 0.3 mm, two of the Al conductors (3*a*, 3*b*) in total were positioned in contact with both surfaces of a 1.5 mm thick Cu plate simulating the plate-like terminal 5 shown in FIGS. 1 and 2, and the Cu plate and the Al conductors (3*a*, 3*b*) were bonded and integrated at the same time by ultrasonic bonding. In this case, the total conductor cross-sectional area (A) of the two Al conductors (3*a*, 3*b*) is 50 mm$^2$, the diameter of the strand (B) is 0.3 mm and an A/B ratio is 167.

Example 7

Using electric wires (1*a*, 1*b*) which have Al conductors (3*a*, 3*b*) each having a conductor cross-sectional area of 22.5 mm$^2$ formed by twisting plural Al strands (2*a*, 2*b*) with a diameter of 0.28 mm, two of the Al conductors (3*a*, 3*b*) in total were positioned in contact with both surfaces of a 1.5 mm thick Cu plate simulating the plate-like terminal 5 shown in FIGS. 1 and 2, and the Cu plate and the Al conductors (3*a*, 3*b*) were bonded and integrated at the same time by ultrasonic bonding. In this case, the total conductor cross-sectional area (A) of the two Al conductors (3*a*, 3*b*) is 45 mm$^2$, the diameter of the strand (B) is 0.28 mm and an A/B ratio is 167.

Example 8

Using electric wires (1*a*, 1*b*) which have Al conductors (3*a*, 3*b*) each having a conductor cross-sectional area of 25 mm$^2$ formed by twisting plural Al strands (2*a*, 2*b*) with a diameter of 1.0 mm, two of the Al conductors (3*a*, 3*b*) in total were positioned in contact with both surfaces of a 1.5 mm thick Al plate simulating the plate-like terminal 5 shown in FIGS. 1 and 2, and the Al plate and the Al conductors (3*a*, 3*b*) were bonded and integrated at the same time by ultrasonic bonding. In this case, the total conductor cross-sectional area (A) of the two Al conductors (3*a*, 3*b*) is 50 mm$^2$, the diameter of the strand (B) is 1.0 mm and an A/B ratio is 50.

Comparative Example 1

Figure 7:
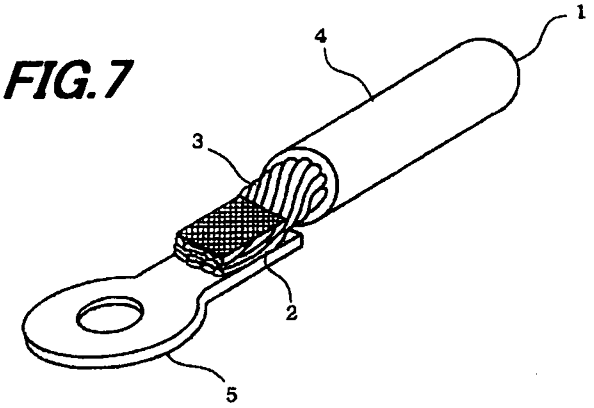
FIG. 7 is a perspective view showing an electric wire with terminal in Comparative Example 1 of the invention in a state after connection.

As shown in FIG. 7, an Al conductor 3 having a conductor cross-sectional area of 40 mm$^2$ formed by twisting plural Al strands 2 with a diameter of 1.0 mm was positioned in contact with one surface of a 1.5 mm thick Cu plate simulating the plate-like terminal 5, and the Cu plate and the Al conductor 3 were bonded and integrated by ultrasonic bonding. In this case, the total conductor cross-sectional area (A) of a single Al conductor 3 is 40 mm$^2$, the diameter of the strand (B) is 1.0 mm and an A/B ratio is 40.

Comparative Example 2

Figure 8:
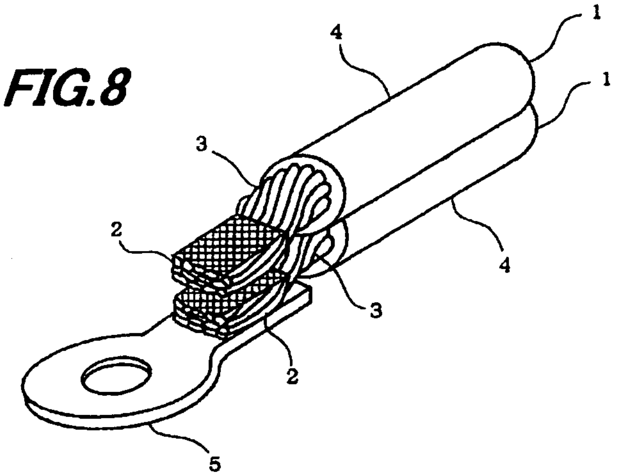
FIG. 8 is a perspective view showing an electric wire with terminal in Comparative Example 2 of the invention in a state after connection.

As shown in FIG. 8, an Al conductor 3 having a conductor cross-sectional area of 20 mm$^2$ formed by twisting plural Al strands 2 with a diameter of 1.0 mm was positioned in contact with one surface of a 1.5 mm thick Cu plate simulating the plate-like terminal 5, and the Cu plate and the Al conductor 3 were bonded and integrated by ultrasonic bonding. Subsequently, an Al conductor 3 having the same structure was positioned to be stacked on the Al conductor 3 on the one surface of the Cu plate, and bonding and integration were carried out by ultrasonic bonding in the same manner. In this case, the total conductor cross-sectional area (A) of the two Al conductors 3 is 40 mm$^2$, the diameter of the strand (B) is 1.0 mm and an A/B ratio is 40.

Comparative Example 3

Using electric wires (1*a*, 1*b*) which have Al conductors (3*a*, 3*b*) each having a conductor cross-sectional area of 25 mm$^2$ formed by twisting plural Al strands (2*a*, 2*b*) with a diameter of 0.28 mm, two of the Al conductors (3*a*, 3*b*) in total were positioned in contact with both surfaces of a 1.5 mm thick Cu plate simulating the plate-like terminal 5 shown in FIGS. 1 and 2, and the Cu plate and the Al conductors (3*a*, 3*b*) were bonded and integrated at the same time by ultrasonic bonding. In this case, the total conductor cross-sectional area (A) of the two Al conductors (3*a*, 3*b*) is 50 mm$^2$, the diameter of the strand (B) is 0.28 mm and an A/B ratio is 179.

Prior Art 1

Figure 9:
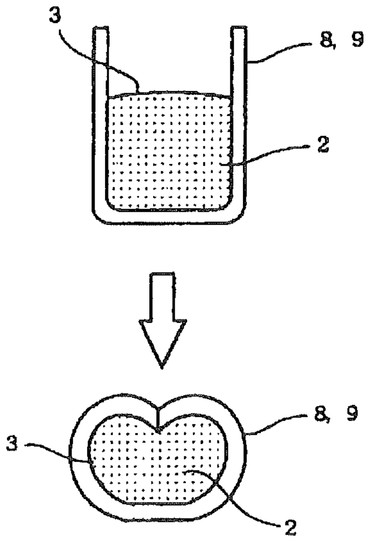
FIG. 9 (Prior Art)
FIG. 9 is a perspective view showing an electric wire with terminal in Prior arts 1 and 2 in a state before and after connection.

As shown in FIG. 9, an Al conductor 3 having a conductor cross-sectional area of 40 mm$^2$ formed by twisting plural Al strands 2 with a diameter of 1.0 mm was positioned in contact with an inner surface of a 1.5 mm thick Cu plate terminal 8 formed in an open-barrel shape, and the Cu plate terminal 8 and the Al conductor 3 were bonded and integrated by ultrasonic bonding. Further, as shown in the drawing pointed by the arrow, a portion connected by the ultrasonic bonding was processed by compressing to form a connecting portion having an oval cross section. In this case, the total conductor cross-sectional area (A) of a single Al conductor 3 is 40 $mm^2$, the diameter of the strand (B) is 1.0 mm and an A/B ratio is 40.

Prior Art 2

As shown in FIG. 9, an Al conductor 3 having a conductor cross-sectional area of 40 $mm^2$ formed by twisting plural Al strands 2 with a diameter of 1.0 mm was positioned in contact with an inner surface of a 1.5 mm thick Al plate terminal 9 formed in an open-barrel shape, and the Al plate terminal 9 and the Al conductor 3 were bonded and integrated by ultrasonic bonding. Further, as shown in the drawing pointed by the arrow, a portion connected by the ultrasonic bonding was processed by compressing to form a connecting portion having an oval cross section. In this case, the total conductor cross-sectional area (A) of a single Al conductor 3 is 40 $mm^2$, the diameter of the strand (B) is 1.0 mm and an A/B ratio is 40. Note that, Prior arts 1 and 2 are different only in a material of the terminal.

Prior Art 3

Figure 10:
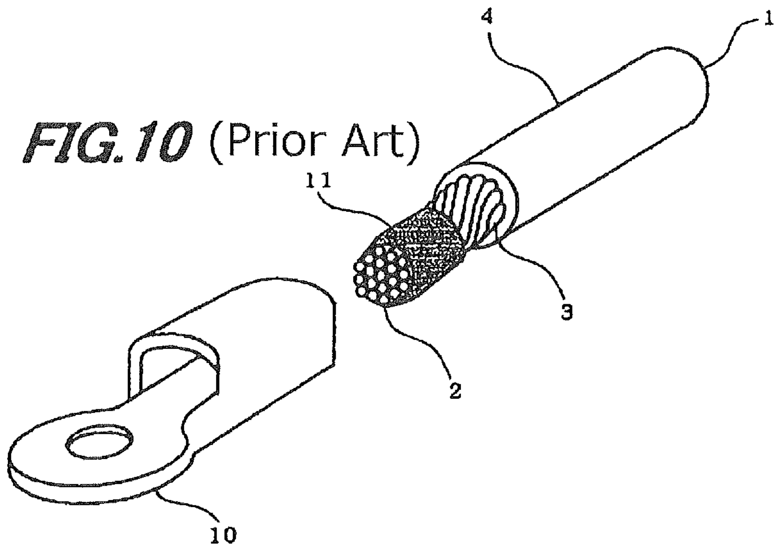
FIG. 10 (Prior Art)
FIG. 10 is a perspective view showing an electric wire with terminal in Prior art 3 in a state before connection.
Figure 11:
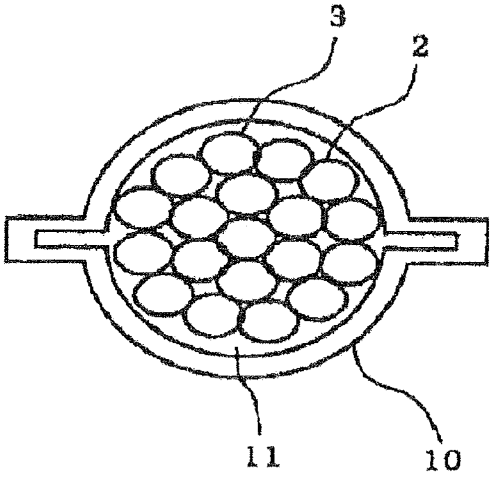
FIG. 11 (Prior Art)
FIG. 11 is a cross sectional view showing the electric wire with terminal in Prior art 3 in a state after connection.

As shown in FIG. 10, an Al conductor 3, which has a conductor cross-sectional area of 40 $mm^2$ and is formed by twisting plural Al strands 2 with a diameter of 1.0 mm and of which connecting portion was treated by a Sn—Zn solder 11, was positioned on an inner surface of a 1.5 mm thick Al plate terminal 10 formed in a cylindrical shape, and the Al plate terminal 10 and the Al conductor 3 were bonded and integrated by compression joint. The cross-sectional shape of the connecting portion is as shown in FIG. 11. In this case, the total conductor cross-sectional area (A) of a single Al conductor 3 is 40 $mm^2$, the diameter of the strand (B) is 1.0 mm and an A/B ratio is 40.

Prior Art 5

An Al conductor having a conductor cross-sectional area of 40 $mm^2$ formed by twisting plural Al strands with a diameter of 1.0 mm was positioned on an inner surface of a 1.5 mm thick Al plate terminal formed in a cylindrical shape, and the Al plate terminal and the Al conductor were bonded and integrated by compression joint. The cross-sectional shape of the connecting portion is as shown in FIG. 11. In this case, the conductor cross-sectional area (A) of a single Al conductor is 40 $mm^2$, the diameter of the strand (B) is 1.0 mm and an A/B ratio is 40.

The values below are joint widths of the Cu and Al plates simulating the plate-like terminal 5 in the above-mentioned Examples and Comparative Examples, which are substantially equal to the diameters of the wires each having a conductor cross-sectional area as well as an insulation layer. Conductor cross-sectional area of 10 $mm^2$—joint width of 6 mm, conductor cross-sectional area of 20 $mm^2$—joint width of 8 mm, conductor cross-sectional area of 30 $mm^2$—joint width of 10 mm, conductor cross-sectional area of 40 $mm^2$—joint width of 12 mm, conductor cross-sectional area of 45 $mm^2$—joint width of 13 mm, and conductor cross-sectional area of 50 $mm^2$—joint width of 15 mm.

Connection strength (initial value and value after salt spray test), contact resistance (initial value and value after salt spray test) and the total cost related to the connection work including materials and processes of a connecting portion between a terminal and a wire conductor in the above-mentioned Examples, Comparative Examples and Prior arts were each compared and a comprehensive evaluation was conducted. The results are shown in Table 1.

TABLE 1

| | | | Total conductor | | | | Connection strength | | Contact resistance | | | |
|---|---|---|---|---|---|---|---|---|---|---|---|---|
| | | Material of Terminal/ conductor | cross-sectional area (A) ($mm^2$) | Diameter of strand (B) (mm) | A/B (mm) | Terminal Surface for connection | Initial stage | After salt spray test | Initial stage | After salt spray test | Cost | Comprehensive evaluation |
| Examples | 1 | Cu/(two) Al | 20 | 1.0 | 20 | Both surfaces (one tier) | ○ | ○ | ○ | ○ | ○ | ○ |
| | 2 | Cu/(two) Al | 40 | 1.0 | 40 | Both surfaces (one tier) | ○ | ○ | ○ | ○ | ○ | ○ |
| | 3 | Cu/(two) Al | 50 | 1.0 | 50 | Both surfaces (one tier) | ○ | ○ | ○ | ○ | ○ | ○ |
| | 4 | Cu/(two) Al | 50 | 1.0 | 50 | Both surfaces (two tiers) | ○ | ○ | ○ | ○ | Δ | Δ |
| | 5 | Cu/(one) Al | 50 | 1.0 | 50 | Both surfaces (one tier) | ○ | Δ | ○ | ○ | ○ | ○ |
| | 6 | Cu/(two) Al | 50 | 0.3 | 167 | Both surfaces (one tier) | ○ | ○ | ○ | ○ | ○ | ○ |
| | 7 | Cu/(two) Al | 45 | 0.28 | 161 | Both surfaces (one tier) | ○ | ○ | ○ | ○ | ○ | ○ |
| | 8 | Al/(two) Al | 50 | 1.0 | 50 | Both surfaces (one tier) | ○ | ○ | ○ | ○ | ○ | ○ |
| Comparative | 1 | Cu/(one) Al | 40 | 1.0 | 40 | One surface (one tier) | Δ | X | Δ | X | ○ | X |
| Examples | 2 | Cu/(two) Al | 40 | 1.0 | 40 | One surface (two tiers) | X | X | X | X | Δ | X |
| | 3 | Cu/(two) Al | 50 | 0.28 | 179 | Both surfaces (one tier) | Δ | X | Δ | X | ○ | X |
| Prior | 1 | Cu/(one) Al | 40 | 1.0 | 40 | One surface | ○ | Δ | ○ | Δ | X | X |
| arts | 2 | Al/(one) Al | 40 | 1.0 | 40 | One surface | Δ | X | ○ | Δ | X | X |
| | 3 | Al/(one) Al | 40 | 1.0 | 40 | Compression joint | ○ | ○ | ○ | ○ | X | X |
| | 4 | Al/(one) Al | 20 | 1.0 | 20 | Compression joint | ○ | Δ | Δ | X | ○ | X |
| | 5 | Al/(one) Al | 40 | 1.0 | 40 | Compression joint | ○ | Δ | Δ | X | ○ | X |

Prior Art 4

An Al conductor having a conductor cross-sectional area of 20 $mm^2$ formed by twisting plural Al strands with a diameter of 1.0 mm was positioned on an inner surface of a 1.5 mm thick Al plate terminal formed in a cylindrical shape, and the Al plate terminal and the Al conductor were bonded and integrated by compression joint. The cross-sectional shape of the connecting portion is as shown in FIG. 11. In this case, the conductor cross-sectional area (A) of a single Al conductor is 20 $mm^2$, the diameter of the strand (B) is 1.0 mm and an A/B ratio is 20.

Regarding the connection strength, a tensile testing machine was used and a tensile test was conducted by gripping both edges of the terminal and the wire conductor which were bonded and integrated in Examples, Comparative Examples and Prior arts. Then, tensile stress which causes breakage or pull-out of the conductor was measured. The connection strength was evaluated as "○" when the result was 90% or more of the tensile stress of a conductor alone, as "Δ" when 85% or more and less than 90% and as "X" when 75% or more and less than 85%. Meanwhile, regarding the contact resistance, resistance was measured by using a DC fourterminal method under the energization condition of flowing a current of 10 Am in the connecting portion. The contact resistance was evaluated as "○" when the resistance is 30 μΩ or less, as "Δ" when more than 30 μΩ and less than 60 μΩ and as "X" when 60 μΩ or more. In any evaluations, "Δ" indicates "passed", "○" indicates "excellent" and "X" indicates "failed".

From Table 1, it is understood that excellent values are obtained for not only the initial connection strength but also the connection strength after the salt spray test in Examples 1 to 8 in which an Al conductor is bonded to both surfaces of a Cu or Al plate simulating the plate-like terminal. In addition, it is understood that excellent values are obtained for the contact resistance in the initial stage as well as after the salt spray test. This is because, since a distance to the connection interface between the terminal and the conductor for transferring ultrasonic energy in Examples 1 to 8 is shorter than the case of bonding to one surface of the Cu or Al plate by ultrasonic bonding as is in Comparative Examples 1 and 2 and transfer characteristics of the ultrasonic energy can be thereby improved, it is possible to bond at smaller ultrasonic energy and pressure. Additionally, it is because the contact area between the terminal and the wire conductor can be increased about twofold by a method of bonding a wire conductor to both surfaces of a terminal as compared to the case of bonding to one surface. Meanwhile, although the problem of strand breakage in the conductor or a decrease in connection strength caused by material fatigue arises when a wire conductor having a large cross-sectional area is forcibly bonded to one surface of the terminal by strong ultrasonic energy and pressure, the front-back connection in Examples 1 to 8 allows connection at smaller ultrasonic energy and applied pressure and is highly effective especially for connection of a conductor having a large cross-sectional area as is in Example 3 and for connection of a conductor formed by twisting thin strands as is in Example 6.

A front-back connection method includes a method in which a wire conductor is bonded to both surfaces of a terminal at the same time by performing ultrasonic bonding once, such as Examples 1 to 3, and a method in which connection is carried out twice by performing ultrasonic bonding on one surface after another. Although the method of simultaneously bonding to the both surfaces is more advantageous from the viewpoint of the cost, the connection cost can be suppressed by the method of bonding to one surface after another as compared to the case of combining the ultrasonic bonding and the compression joint such as Prior arts 1 and 2 since only the same work is repeated.

In Examples 1 to 8 in which a ratio of the total conductor cross-sectional area (A) to the outer diameter of strand (B) is 167 or less, strand breakage occurs less at the time of connection and a decrease in the mechanical connection strength and the electrical connection (contact resistance) due to the strand breakage is smaller than Comparative Example 3 in which the (A)/(B) ratio is 179.

A material of the terminal is not limited to a Cu-based material, and an Al-based material also achieves the same effect as is understood from Example 8.

In the method of Comparative Example 1 in which bonding of an Al conductor is started from one surface of a terminal (Cu plate) by using ultrasonic bonding, ultrasonic energy does not sufficiently reach the connection interface between Cu and Al when a conductor has a large cross-sectional area, and a problem thereby occurs in connection strength and contact resistance. In the method of Comparative Example 2 in which two Al conductors in total are stacked one by one on one surface of a terminal (Cu plate) and bonded by ultrasonic bonding, the connection interface between Cu and Al of the first tier was separated at the time of bonding the Al conductor to the Al conductor of the second tier, and it was not possible to obtain even a sample for evaluating characteristics.

In the method of Prior art 3 in which an Al conductor is bonded to an inner surface of an Al plate terminal by compression joint, it is necessary to perform surface treatment on connection surfaces of the terminal and the conductor since it is the connection between the Al conductors, and thus, there is a problem that the total cost related to the connection work including materials and processes increases.

In addition, when compression joint between an Al terminal and an Al conductor is conducted using a conductor having a conductor cross-sectional area of 20 $mm^2$ or more without applying solder as is in Prior arts 4 and 5, it is understood that contact resistance after the salt spray test is bad and the reliability of electrical connection is also degraded, as shown in Table 1.

As is seen in the above results and the comprehensive evaluations in Table 1, it is understood that Examples 1 to 8 are excellent in all of connection strength, contact resistance and cost.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An electric wire with a terminal, comprising:

a conductor; and the terminal connected to an end portion of the conductor, wherein the terminal comprises a first connecting portion connected to an electrical equipment and a second connecting portion connected to the conductor, wherein the second connecting portion comprises a first connection surface and a second connection surface opposite to the first connection surface, wherein the conductor comprises a first conductor and a second conductor that are connected to the first connection surface and the second connection surface, respectively, by ultrasonic bonding, wherein the connecting portion of the first connection surface overlaps the connecting portion of the second connection surface in a perpendicular direction to an axial direction of the conductor, and wherein an upper surface of the first conductor comprises a fused area that remains exposed after connection is made between the first conductor and the first connection surface.

2. The electric wire according to claim 1, wherein a cross-sectional area of the first conductor is not more than that of the second conductor.

3. The electric wire according to claim 1, wherein the first conductor and the second conductor each belong to different electric wires.

4. The electric wire according to claim 1, wherein the first conductor and the second conductor belong to a same electric wire.

5. The electric wire according to claim 1, wherein a (A)/(B) ratio is not more than 167, where (A) is a total cross-sectional area of the first conductor and the second conductor and (B) is an outer diameter of a strand composing the conductor.

6. The electric wire according to claim 1, wherein a total cross-sectional area of the first conductor and the second conductor is not less than 20 $mm^2$.

7. The electric wire according to claim 1, wherein the connecting portion of the first connection surface partially overlaps with the connecting portion of the second connection surface.

8. The electric wire according to claim 1, wherein a material of the terminal differs from a material of the conductor.

9. The electric wire according to claim 1, wherein a material of the terminal comprises one of Cu, a Cu alloy, Al, and an Al alloy.

10. The electric wire according to claim 1, wherein a material of the conductor comprises one of Cu, a Cu alloy, Al, and an Al alloy.

11. The electric wire according to claim 1, wherein the end portion of the conductor is rectangular.

12. The electric wire according to claim 1, wherein the conductor comprises a twisted wire formed by twisting plural strands.

13. The electric wire according to claim 4, wherein the first conductor and the second conductor are formed by dividing an end portion of the same electric wire into two portions.

14. The electric wire according to claim 1, wherein an area of the connecting portion between the first connection surface and the first conductor is the same or more than a cross-sectional area of the first conductor.

15. The electric wire according to claim 1, wherein an area of the connecting portion between the second connection surface and the second conductor is the same or more than a cross-sectional area of the second conductor.

16. The electric wire according to claim 1, wherein a connection strength between the terminal and the conductor is 90% or more of a tensile stress of the conductor alone.

17. The electric wire according to claim 1, wherein a contact resistance between the terminal and the conductor is 30 μΩ or less.

18. The electric wire according to claim 1, wherein an entirety of the connecting portion of the first connection surface overlaps the connecting portion of the second connection surface in the perpendicular direction to the axial direction of the conductor.

19. The electric wire according to claim 1, wherein a side surface of the first conductor is exposed.

* * * * *